April 27, 1954   W. A. BAUMGARDNER   2,677,021
PERIODIC SWITCH FOR USE IN AN ELECTRICAL CIRCUIT
TO INDICATE THE ROTATION OF A SHAFT
Filed March 21, 1950

INVENTOR.
WILLIS A. BAUMGARDNER
BY
McMorrow, Berman + Davidson
ATTORNEYS

Patented Apr. 27, 1954

2,677,021

UNITED STATES PATENT OFFICE 2,677,021

PERIODIC SWITCH FOR USE IN AN ELECTRICAL CIRCUIT TO INDICATE THE ROTATION OF A SHAFT

Willis A. Baumgardner, Grassflat, Pa.

Application March 21, 1950, Serial No. 150,901

3 Claims. (Cl. 200—30)

This invention relates to revolution use in an electrical circuit for indicating a periodic switch device, and more particularly to devices for indicating the movement of a rotating shaft.

A main object of the invention is to provide a novel and improved periodic switch device for a revolution indicator which is very simple in construction, which is easy to mount on the end of a shaft, and which provides an accurate indication at a location remote from the shaft as to the rotation of the shaft.

A further object of the invention is to provide an improved periodic switch device for a rotation indicator for remotely indicating the rotation of a shaft or other rotating object, the device involving relatively few parts, being very inexpensive to manufacture, being rugged in construction, and being reliable in operation.

Further objects and advantages of the invention will become apparent from the following description and claims, and from the accompanying drawings, wherein:

Figure 2:
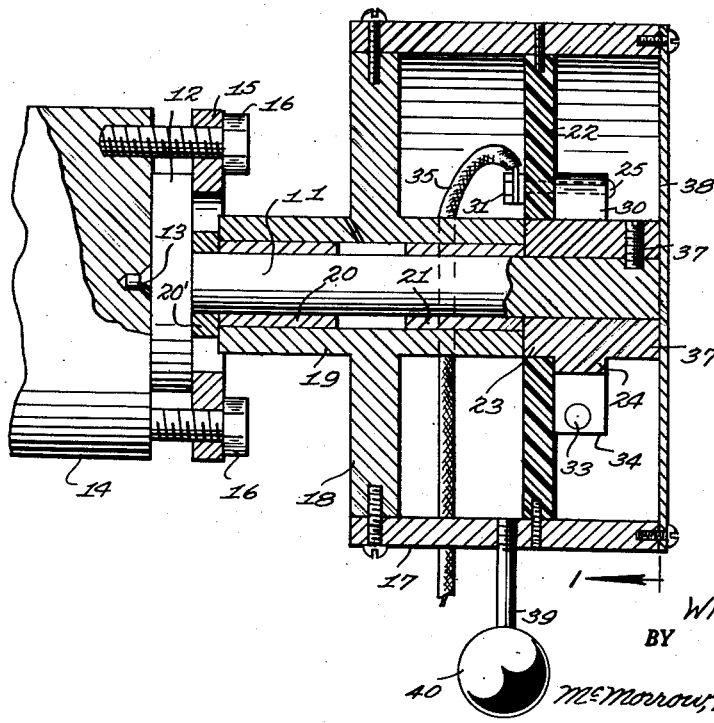
Figure 2 is a vertical longitudinal cross-sectional view taken through the revolution indicator periodic switch device of Figure 1, showing a portion of a shaft end to which the revolution indicator is secured.

Referring to the drawings, 11 indicates a shaft element formed at one end with an annular flange 12 and formed at said end with a tapered spur 13 adapted to be engaged in a center recess in the end of a shaft, such as the shaft 14, whose revolution it is desired to indicate. As shown in Figure 2, the shaft 11 is clamped to the end of the shaft 14 by an annular ring 15 clamped against the flange 12 and secured to end of the shaft 14 by machine screws 16.

Designated at 17 is a cylindrical housing having a rear wall 18 which is integrally carried on a sleeve member 19. Sleeve member 19 is rotatably mounted on shaft 11 by means of the respective bearing bushings 20, 21 interposed between the sleeve member 19 and the shaft 11, as shown in Figure 2. A spacing collar 20' is provided on the shaft 11 between the rear end of the sleeve member 19 and the flange 12. Secured internally in the housing 17 is an annular disc 22 of insulating material. Designated at 24 is an eccentric cam mounted on shaft 11 and having a collar portion 23 rotatably received within the disc 22.

Figure 1:
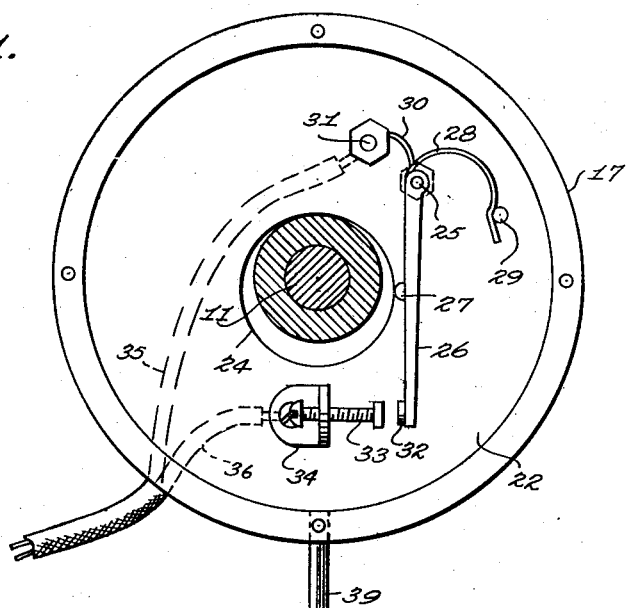
Figure 1 is a front elevational view of an improved revolution indicator periodic switch device according to the present invention, the front cover of the indicator being removed, said view being taken on line I—I of Figure 2.

Cam 24 has a sleeve portion 37 secured to shaft 11 by a set screw 37'. Pivoted to the disc 22 at 25 is a depending arm 26 provided with a projection 27 engaging the periphery of the cam 24. A suitable spring 28 is secured at one end to the arm 26 and is anchored at its other end against a pin 29 carried by the insulating disc 22, said spring being arranged to exert a biasing force on the arm 26, urging said arm clockwise, as viewed in Figure 1, whereby the projection 27 is urged against the periphery of the cam 24. The arm 26 is connected by a conductor 30 to a terminal 31 secured to the disc 22 above the shaft 11, and the lower end of the arm 26 carries a contact 32 engageable with an adjustable contact 33 carried on a bracket 34 secured to the insulating disc 22 below the shaft 11, as shown in Figure 1. Suitable electrical conductors, shown at 35, 36 in dotted view in Figure 1, may be connected respectively to the terminal 31 and to the terminal defined by the adjustable contact 34.

Secured to the forward rim of the housing 17 is an end wall plate 38. Elements 17, 18 and 19 may be cast as a single unit to facilitate production and to reduce the cost of the assembly.

Secured to the intermediate portion of the housing 17 and depending therefrom is a rod 39 which carries a weighted ball 40, said weighted ball biasing the housing 17 to a substantially constant position while the shaft 11 is rotating. Since the weighted ball 40 holds the housing 17 substantially stationary, rotation of the shaft 11 causes the cam 24 to oscillate the arm 26, whereby contact 32 intermittently engages contact 33. The conductors 35 and 36 are connected in a suitable indicating circuit, such as a circuit containing a lamp, a battery, or any other equivalent indicating circuit, which may be remotely located with respect to the shaft 14. Normal rotation of the shaft 14 will therefore be indicated by the periodic energization of the signal lamp or other electrical signal device, and when no such intermittent periodic energization is present, stoppage of the shaft 14 is indicated. The invention therefore provides a convenient and dependable means of continuously checking the rotation of the shaft of any apparatus from a remote location.

While a specific embodiment of a periodic switch device for a revolution indicator has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a revolution indicator for remotely indicating the rotation of a rotating element, a periodic switch device comprising a shaft, an annular flange carried at one end of said shaft, means for clamping said flange to said rotating element, a housing rotatably supported on said shaft for free swinging movement, a depending weight carried by said housing, a cam carried by said shaft, a rigid arm pivoted at one end to said housing, means biasing said arm against said cam, and a contact carried by said housing and arranged for intermittent engagement by said arm responsive to rotation at any time of the shaft relative to the housing.

2. In a revolution indicator for remotely indicating the rotation of a rotating element, a periodic switch device comprising a shaft, an annular flange carried at one end of said shaft, means for clamping said flange to said rotating element, a housing rotatably supported on said shaft for free swinging movement, a depending weight carried by said housing, a transverse annular wall member secured in said housing around said shaft, a cam carried by said shaft adjacent said wall member, a rigid arm pivoted at one end to said wall member and being substantially coplanar with said cam, means biasing the arm against said cam, and a contact carried by said wall member and arranged for intermittent engagement by said arm responsive to rotation at any time of the shaft relative to said housing.

3. In a revolution indicator for remotely indicating the rotation of a rotating element, a periodic switch device comprising a shaft, an annular flange carried at one end of said shaft, means for clamping said flange to said rotating element, a housing rotatably supported on said shaft for free swinging movement, a depending weight carried by said housing, a transverse annular wall member secured in said housing around said shaft, an eccentric cam carried by said shaft adjacent said wall member, a rigid arm pivoted at one end to said wall member and being substantially coplanar with said cam, spring means on said wall member and acting against said arm, said spring means being arranged to bias said arm against said cam, and a contact carried by said wall member and arranged for intermittent engagement by said arm responsive to rotation at any time of the shaft relative to said housing.

References Cited in the file of this patent

UNITED STATES PATENTS

| Number | Name | Date |
|---|---|---|
| 1,289,036 | Kent | Dec. 24, 1918 |
| 2,100,076 | Gilmore | Nov. 23, 1937 |
| 2,375,416 | Huber | May 8, 1945 |
| 2,451,412 | Richbourg | Oct. 12, 1948 |

FOREIGN PATENTS

| Number | Country | Date |
|---|---|---|
| 153,949 | Germany | Sept. 16, 1904 |
| 494,989 | France | Sept. 25, 1919 |